April 24, 1962
H. L. PENBERTHY
3,030,736
METHOD OF HOMOGENIZING GLASS
Filed Jan. 7, 1958
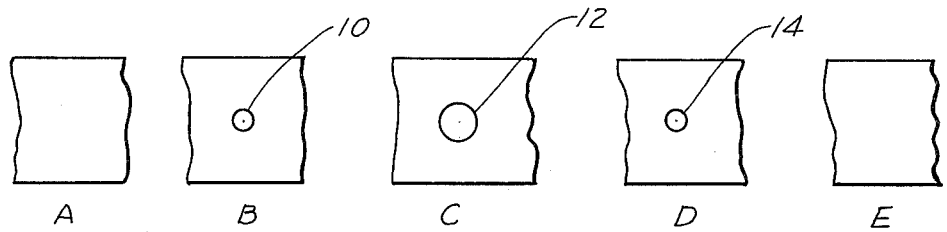
Fig. 1.
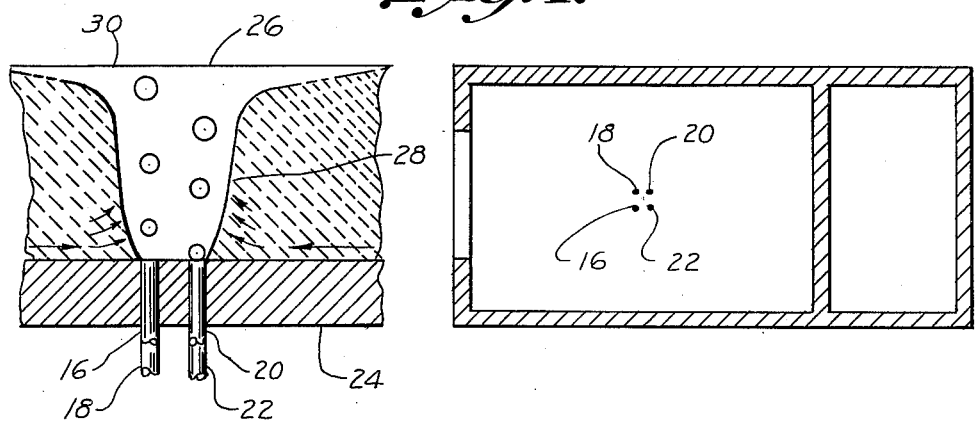
Fig. 2.
Fig. 3.
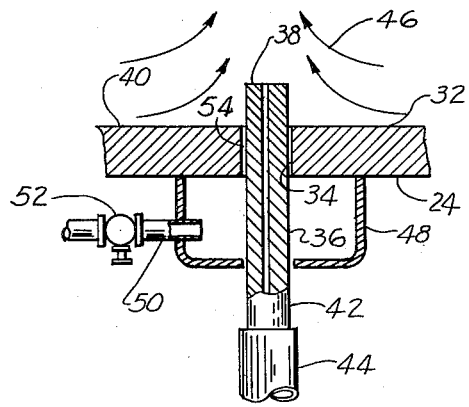
Fig. 4.
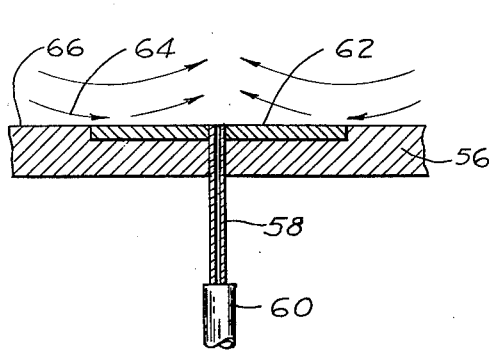
Fig. 5.
INVENTOR.
HARVEY L. PENBERTHY
BY Diggins & LeBlanc
ATTORNEYS

United States Patent Office 3,030,736
Patented Apr. 24, 1962

3,030,736
METHOD OF HOMOGENIZING GLASS
Harvey L. Penberthy, 4301 6th Ave., S., Seattle, Wash.
Filed Jan. 7, 1958, Ser. No. 707,580
5 Claims. (Cl. 49—77)

This invention relates to glass furnaces and methods of glass manufacture and more particularly relates to a new method and apparatus for producing homogeneous glass efficiently.

The manufacture of glass according to modern methods is carried out in continuous furnaces which are usually large and capable of containing many tons of the material which is to be melted and refined. The raw batch is introduced at one end of the tank and is gradually melted and refined as it advances slowly lengthwise of the tank. Heat for melting the batch and refining the molten glass is normally applied in the form of flames or gases of combustion applied to the surface of the material.

The heat efficiency of such furnaces in terms of heat utilized/heat applied, is generally quite low, rarely exceeding 25% and sometimes as low as 5%. In addition, it is frequently difficult to secure a satisfactory glass homogeneity, a problem which is particularly bad when the product of the furnace is used to produce sheet glass. One possible solution to the homogeneity and efficiency problems is found in the use of electric boosting units. While such systems work an improvement in the homogeneity and efficiency of the furnace, however, they necessitate the use of electric power which may not always be feasible in a given furnace installation and which, to at least a certain extent, involves the substitution of electric for combustion heating.

According to the present invention it has now been found that it is possible to increase glass homogeneity and to improve furnace efficiency without introducing additional heat to the glass from an auxiliary heat source such a source of electric power. According to the present invention, it has been found that if a series of streams of gas bubbles are introduced into the glass furnace substantially at the floor thereof in closely associated clusters arranged in a closed pattern, the individual streams of glass bubbles cooperate or coact each with the other to produce a single rising columnar stream of glass.

According to a further feature of the invention, it has been found that this stream must be so arranged in the furnace that it is able to pick up cold glass at the floor of the furnace and to feed it through the rising column to the surface of the molten glass mass and to then allow the cold glass to spread out across the surface of the glass much in the shape of the bell end of a trumpet or horn. This effects the presentation of a large surface area of cold glass to the flame or combustion heat and the efficiency of transfer of heat from the flame to the glass is markedly improved. In order to create and sustain this bell-shaped rising column of glass it is necessary that the column should be isolated from other rising currents and that where plural columns are used they should be so spaced and situated in the glass tank that the glass fanning forth at the top of the column can return to the bottom in a steady more or less uniform flow. Thus, while the invention contemplates that more than one rising column of glass may be utilized in a given tank, the plural columns must be spaced from one another in order to achieve uniform and steady columnar flow and the bell-shaped effect which produces the large area of cold glass at the surface of the glass mass.

It is also an important feature of the invention that the bubbles producing the rising current should be substantially at the floor of the furnace and in any event in the lower third of the glass mass so as to insure that the coolest glass is drawn into the rising column. The effect of the formation of such a bell-shaped columnar stream of glass in the furnace is to reduce the heat input in order to produce a given output and to simultaneously materially improve the homogeneity of the glass. Alternatively the method of the invention may be used to increase the output of a furnace without increasing the input.

I am aware that other have heretofore proposed the introduction of gas bubbles into molten glass for a large variety of purposes. No one, to my knowledge, however, has utilized an arrangement of bubble producing orifices which was capable of producing the isolated uniform and steady columnar bell-shaped cold glass currents of my invention, nor was the advantage of such isolated currents appreciated.

It is accordingly a primary object of the present invention to provide a method and apparatus for manufacturing glass in an efficient manner and with a high degree of homogeneity.

It is another object of the invention to provide a method and apparatus for manufacturing glass at a high efficiency without the necessity of introducing heat from an auxiliary source.

It is another object of the present invention to provide a method and apparatus for manufacturing glass in which the efficiency of a combustion furnace is improved through the utilization of grouped bubble sources at the bottom of the furnace which produce a rising column of cold glass which is bell-shaped in cross section.

These and other objects and advantages of the invention will become more apparent upon reference to the following specification and claims and appended drawings wherein:

FIGURE 1 is a partial vertical cross section of the glass mass in a glass furnace showing the effect produced by the single bubblers which have been used heretofore;

FIGURE 2 is a partial vertical cross section of a glass furnace showing the rising bell shaped column of glass produced according to the present invention;

FIGURE 3 is a horizontal section through a glass furnace showing the placement of bubbler tubes therein according to one specific embodiment of the invention;

FIGURE 4 is a vertical cross section through the bottom of a glass furnace having a bubbler apparatus installed according to one embodiment of the invention; and FIGURE 5 is a vertical cross section of the bottom of a glass furnace showing a bubbler constructed according to another embodiment of the invention.

Referring to FIGURE 1, there are shown at A, B, C, D and E squares of the surface of a mass of molten glass in a glass furnace during successive intervals of time as bubbles from a single bubble tube rise through that glass mass. As will be understood by those skilled in the art, the hot glass at the top of the molten mass is normally a very bright yellow. As a single bubble rises through the molten mass from the layer of cold glass at the bottom of the furnace, a certain amount of cold glass is carried upwardly and its arrival at the surface of the molten glass mass can be detected by the appearance of a black spot of gradually increasing diameter. This black spot reaches a maximum diameter of a few inches, as shown at 12, and then starts to shrink as shown at 14 and finally disappears as is depicted in E. Any number of additional bubblers arranged in a straight line produce the same result and experience has demonstrated that it is impossible to maintain a black spot of uniform diameter at low rates of gas flow or bubble formation. As an example, bubbler tubes were arranged in a line 28 inches apart having a width of 14 feet and 4 inches. It was impossible to maintain black spots of cold glass at the surface of the glass mass at low rates of bubble formation and the operation of the bubbler arrangement in general was erratic and unpredictable. Where the bubble rates are increased the black spot remains but fluctuates in sizes with the bursting of the bubbles at the glass surface. The performance is still erratic and unpredictable. That is to say, while some increase in homogeneity is obtained the increase is erratic and is not constant, with some of the furnace output showing no increase at all.

In the specific example mentioned, the furnace had been producing inhomogeneous glass which, when formed into 44 inch wide rolled sheets about ¼ inch thick, bowed upwards after annealing as much as .050 inch across a base length of only 24 inches. With the aforementioned row of single bubblers this bow was erratically reduced to .010 to .030 inch which is not particularly satisfactory for window glass purposes.

According to the method of this invention the bow in the same furnace was reduced to a uniform .001 inch, which is considered perfect for window glass purposes.

Referring to FIGURES 2 and 3, there is shown a bubbler installation and method of operation according to the present invention wherein four bubbler tubes 16, 18, 20 and 22 are mounted in a close cluster in the floor 24 of a glass furnace. These bubblers are mounted at the corners of a rectangle and in the specific embodiment illustrated are approximately 14 inches apart. This installation was made in the same furnace previously mentioned and when gas was fed through the bubbler tubes at the same rate as it was fed through the single tube, as illustrated in FIGURE 1, bubbles 26 were formed and cooperated to create a rising columnar stream of cold glass 28 which opened out on to the surface of the glass mass much in the manner of a bell of a trumpet or horn at 30. The diameter of the black spot cold glass formed on the surface of the glass mass was about 3–5 feet in a furnace about 24 inches deep. With a deeper furnace the size of the black spot is increased proportionately.

While the gas may be fed to the bubbler tubes intermittently this is not necessary. In the specific example discussed the bubbler tubes had an internal diameter of ⅛ inch and the gas utilized was compressed air throttled down to produce about 10–18 bubbles per tube per minute. The rate of feed of the gas is adjusted until the bell shaped columnar flow is obtained and until a maximum diameter black spot is obtained.

While a rectangular arrangement of bubblers has been specifically illustrated other configurations of bubble tube clusters can be used so long as there are at least three bubble tubes in the cluster. A lesser number fails to provide the necessary coaction with the result that no columnar bell shaped flow is set up. While only one cluster has been illustrated, in the drawings, it has been found that in certain furnaces additional clusters are advantageous. The different clusters are normally spaced from one another by no less than the black spot diameter so that surface glass can drop back down to be re-pumped back to the surface for the better mixing which is the result of the method of the invention.

As a specific example of an arrangement of plural clusters of bubble orifices, a furnace 15 feet in width and 24 inches deep may be provided with three clusters of bubble orifices. Each cluster may consist of four bubbler tubes mounted at the corners of a square having 14 inch sides and having inside diameters of ⅛ inch. The clusters may be mounted on a line across the tank with the center cluster in the center of the tank and the other two clusters mounted on centers 5 feet either side thereof. Under such circumstances a supply of compressed air producing 10–18 bubbles per tube per minute produces three black spots 3–5 feet in diameter and produces uniformly homogeneous glass.

With the single and multiple bubblers which have been utilized previously there have been no individual uniform rising streams of glass, and there was thus no difficulty experienced with the manner of insertion of the bubbler tube. According to the invention, it has been found that where these strong rising streams of glass have been created there is a scouring action produced concentrically around the group of bubblers which rapidly tends to erode away the surface of the tank floor. This action is so rapid and pronounced and is so obscured from view that it may eat a hole in the tank floor before the operator realizes that anything unusual is happening. A bubbler tube also tends to be eaten away by this current to create a continuous lowering of the point of bubble origin so as to make the erosion process self-perpetuating until the floor has been completely punctured.

Referring to FIGURE 4, there is shown at 32 the bottom wall of a glass furnace having therein an aperture 34 in which is mounted a bubbler tube 36 which has its end 38 located above the surface 40 of the bottom wall 32. The bubbler tube 36 preferably consists of a cast refractory material, such as cast zirconium aluminate, as for instance, the commercial material manufactured by Corhart Refractories of Louisville, Kentucky, and marketed under the trade name "Zac." Other erosion resistant cast refractories are satisfactory and it is also possible to utilize refractory metals such as platinum or molybdenum.

The tube 36 is provided with a suitable gas passage 42 which receives a supply of gas through a conduit 44. According to the preferred embodiment of the invention there is a slight clearance between the outer diameter of the tube 36 and the inner diameter of the aperture 34 in the bottom wall 32 and the annular space defined by these two surfaces is filled with glass which freezes or solidifies as it escapes sufficiently far from the surface 40 of the tank floor. This locks the tube 36 in position and prevents leakage of glass from the furnace.

When the bubbler tube 36, made of a refractory material, is mounted as shown in FIGURE 4 with the point of bubble origin spaced from the upper surface 32 of the bottom wall, the rising stream of glass 46 caused by the action of this bubbler in cooperation with other bubblers in the cluster is sufficiently removed from the surface of the bottom wall that little or no scouring takes place and the life of the tank is not shortened due to the use of the bubble apparatus. While it is desirable that this point of bubble release be spaced above the furnace floor, the point should not be above the lower third of the glass mass in the tank in order to bring up the cold glass from the bottom of the furnace according to the method of the invention.

According to the present invention the bubble tube 36 is provided with a heating chamber 48 therearound and the chamber 48 is fitted with one or more burners 50 entering the walls thereof and provided with a supply of combustible fuel through suitable valves 52. When the fuel flowing through the burners 50 is ignited the exposed portion of the bubbler tube 36 is heated so as to melt the glass 54 frozen in the annular space between the bubbler tube and the aperture 34. This makes it possible to move the tube 36 into the furnace to compensate for bubbler tube wear.

While the foregoing represents the preferred embodiment of the invention it is also contemplated that satisfactory bubbler operation may be carried out through the use of a bubbler tube which does not have to be raised substantially above the surface of the tank floor. Accordingly there is shown in FIGURE 5 a bottom tank wall 56 having a bubbler tube mounted therein and receiving a supply of gas through a conduit 60. This tube 58 need not be a cast refractory material but may be an uncooled refractory metal such as molybdenum. Immediately around the upper end of the tube 58 there is provided an insert 62 of a cast refractory material such as zirconium aluminate. This material need not be thick and as a general rule may be somewhat less than one-half the thickness of the furnace floor. It will be obvious, however, that increased thickness may be used where desired at a slight increase in cost. The dimensions of the insert 62 are so chosen that all of the scouring currents indicated at 64 strike the erosion resistant insert rather than the surrounding furnace floor 66 so as to prevent erosion and furnace floor destruction.

It will be apparent from the foregoing that according to this invention there is disclosed a unique method of manufacturing glass wherein it is possible to obtain higher heat efficiencies without the introduction of heat from an auxiliary source although such heat may be used additionally if this is desired. At the same time that these improved efficiencies are obtained, the homogeneity of the glass is materially improved so that it is possible to realize a materially increased revenue from a furnace to which the method of the invention is adapted. This increase in efficiency and homogeneity is predicated upon the use of grouped bubbler tubes to produce isolated rising columnar streams of glass which fan out at the surface of the glass mass in the cross sectional shape of a bell or horn. These columns of glass rise from the floor of the furnace to the surface of the glass mass and are effective to raise the coldest glass in the furnace to the surface of the glass to bring about maximum heat transfer. As a further feature of the invention specific bubbler constructions are utilized to prevent the possibility of damage to the furnace which might occur if older bubbler tube concepts were resorted to.

This application is a continuation-in-part of my co-pending applications Serial Nos. 505,672 and 493,112 both now abandoned.

The invention may be embodied in other specific forms without departing from the spirit or essential characteristics thereof. The present embodiments are therefore to be considered in all respects as illustrative and not restrictive, the scope of the invention being indication by the appended claims rather than by the foregoing description, and all changes which come within the meaning and range of equivalency of the claims are therefore intended to be embraced therein.

What is claimed and desired to be secured by United States Letters Patent is:

1. In the method of manufacturing glass through the use of combustion heat applied to the surface of molten glass the steps comprising; flowing at least three closely grouped streams of bubbles arranged in a closed pattern into said glass substantially at the bottom of the glass mass, said streams of bubbles being sufficiently close to one another to form a substantially unitary, isolated column of rising glass which continuously fans out at the surface of the glass mass, and simultaneously maintaining the glass immediately surrounding said column in a substantially quiescent condition.

2. In the method of manufacturing glass through the application of combustion heat to the surface of a molten mass of glass wherein the surface of the glass mass is bright yellow, the steps comprising; flowing at least three closely grouped streams of bubbles into said glass mass in the lower third thereof in a closed pattern and at a rate sufficient to create a substantially unitary, isolated column of cool glass rising from the bottom of the glass mass which continuously fans out at the surface of the glass mass to present a dark pool of cool glass of a diameter exceeding the spacing between any two of said streams of bubbles.

3. A method of manufacturing glass through the application of combustion heat to the surface of a molten mass of glass comprising the steps of flowing at least three closely grouped streams of bubbles of gas into said glass mass in the lower third thereof wherein one of said streams is substantially equal distances from the other two and the other two are spaced from one another a distance less than the sum of the distances from said one stream to the other two, said streams being flowed at substantially equal rates which are sufficient to create a substantially unitary, isolated column of cool glass rising from the bottom of the glass mass and continuously fanning out at the surface thereof.

4. A mehod as set out in claim 3 including the step of maintaining the glass immediately surrounding said column substantially quiescent.

5. In the method of manufacturing glass through the application of combustion heat to the surface of a molten mass of glass wherein the surface of the glass mass is bright yellow, the steps comprising; flowing at least three closely grouped streams of bubbles into said glass mass in the lower third thereof in a closed pattern and at a rate sufficient to create a substantially unitary isolated column of cool glass rising from the bottom of the glass mass which continuously fans out at the surface of the glass mass to present a dark pool of cool glass having an area in excess of the sum of the black pool areas which could be created by streams of bubbles spaced a greater distance.

References Cited in the file of this patent

UNITED STATES PATENTS

| | | |
|---|---|---|
| 2,233,631 | Miller et al. | Mar. 4, 1941 |
| 2,263,848 | Keaney | Nov. 25, 1941 |
| 2,271,366 | Field | Jan. 27, 1942 |
| 2,331,052 | Shadduck | Oct. 5, 1943 |
| 2,593,197 | Rough | Apr. 15, 1952 |
| 2,636,914 | Arbeit | Apr. 28, 1953 |

FOREIGN PATENTS

| | | |
|---|---|---|
| 523,481 | Belgium | Apr. 13, 1954 |
| 486,200 | Germany | Nov. 13, 1929 |
| 724,381 | Great Britain | Feb. 16, 1955 |